United States Patent

De Wames et al.

[11] Patent Number: 4,467,235
[45] Date of Patent: Aug. 21, 1984

[54] SURFACE ACOUSTIC WAVE INTERFEROMETER

[75] Inventors: Roger E. De Wames; Edward J. Staples, both of Thousand Oaks, Calif.

[73] Assignee: Rockwell International Corporation, El Segundo, Calif.

[21] Appl. No.: 357,398

[22] Filed: Mar. 12, 1982

[51] Int. Cl.³ .................................................. H03H 9/76
[52] U.S. Cl. ............................. 310/313 D; 73/517 R; 310/313 B; 310/329
[58] Field of Search ............... 310/313 D, 313 B, 329; 333/151, 153, 195; 73/517 R; 331/155

[56] References Cited

U.S. PATENT DOCUMENTS

| | | | |
|---|---|---|---|
| 3,888,115 | 6/1975 | Schwartz | 310/313 B |
| 3,940,636 | 2/1976 | Perahia | 73/517 R |
| 4,100,512 | 7/1978 | Valdois et al. | 331/158 |
| 4,199,990 | 4/1980 | Valdois et al. | 73/517 AV |
| 4,301,683 | 11/1981 | Hartemann et al. | 73/517 R |
| 4,309,679 | 1/1982 | Furuya et al. | 333/195 |
| 4,346,597 | 8/1982 | Cullen | 73/510 |

FOREIGN PATENT DOCUMENTS 120051 10/1978 Japan .................................. 333/195

OTHER PUBLICATIONS

Ivanov, et al., An Interferometric Acoustooptic Method for Measuring High-Frequency Acoustic Losses in Isotropic and Anisotropic Materials with High Q-Factor, IEEE Trans. Sonics and Ultrasonics, vol. SU-26, p. 362, (1979).
Kino, et al., Acoustic Surface Waves, Scientific American, p. 51, (Oct., 1972).
Murray, et al., SAW Components Answer Today's Signal Processing Needs, Electronics, p. 120, (Sep. 8, 1981).

Primary Examiner—J. D. Miller
Assistant Examiner—D. L. Rebsch
Attorney, Agent, or Firm—H. Fredrick Hamann; Craig O. Malin; John J. Deinken

[57] ABSTRACT

Disclosed is a surface acoustic wave interferometer, including a substrate on which are disposed a first reflector and a second reflector so as to define a multimode resonant cavity therebetween. A third reflector is positioned on the substrate so that a single mode resonant cavity is defined between the second and third reflectors. An input transducer generates surface acoustic waves in the single mode cavity, while an output transducer detects the interference between surface acoustic waves in the multimode and single mode cavities. A base is rigidly affixed to the substrate in the region of the single mode cavity so that a force applied to the substrate will alter the surface acoustic wave propagation characteristics within the multimode cavity.

8 Claims, 5 Drawing Figures

SURFACE ACOUSTIC WAVE INTERFEROMETER

BACKGROUND OF THE INVENTION

This invention relates to devices for generating, detecting, and analyzing surface acoustic waves.

A surface acoustic wave is one of several types of wave motion in which acoustic energy may appear as it travels through a solid medium. Bulk acoustic waves, for example, propagate through the interior of an acoustically conductive medium and, in general, exhibit a single type of motion, such as shear or longitudinal waves, while surface waves are a more complex mixture of these shear and longitudinal motions which is made possible by the presence of a stress free boundary condition. Because of this boundary condition, surface wave energy extends only a few wavelengths into the bulk of the propagating medium. This concentration of surface wave energy near the surface makes a variety of applications for surface waves possible in the field of electronics, such as signal filtering, the amplification of weak signals, the storage of signals in delay lines, the provision of highly accurate frequency references, and the detection of physical changes, like pressure or temperature, which affect the propagation characteristics of surface acoustic waves in a medium.

Practical applications for surface acoustic wave devices have expanded dramatically since the development of the interdigital transducer, which is capable of efficiently converting an electrical signal into a surface acoustic wave and vice versa. A simple interdigital transducer consists of a pair of interleaved electrodes which are placed in electrical contact with a piezoelectric material. When such a material is distorted, it produces an internal electric field. Conversely, if an electric field is applied to a piezoelectric material, the material will expand or contract, depending upon the polarity of the applied field. Because of this phenomenon, when a rapidly changing electrical signal is applied to a piezoelectric material through an interdigital transducer, the material will vibrate in response to the electrical signal, thereby generating a surface acoustic wave. A pair of single-fingered electrodes will not produce surface acoustic waves efficiently, but a multiple number of electrode fingers, when placed in an intedigitating pattern, will each excite an acoustic wave and, if the spacing between the fingers is properly related to the desired acoustic wavelength, the separately excited waves can be made to reinforce one another and produce a suitably large acoustic singal.

One of the most promising applications for surface acoustic wave technology has occurred in the design of crystal resonators for use in such devices as multipole crystal filters, crystal controlled oscillators, and tuned radio frequency receivers. In the past, bulk wave quartz crystal resonators with a high Q (quality factor) have been extensively employed to stabilize the frequencies of such oscillator circuits. Undesirable spurious modes can appear in the response of a bulk crystal resonator, however, and, in addition, bulk wave resonator technology is limited in its frequency range because a minimum thickness must be maintained in the crystal to ensure an adequate amount of physical strength. With the advent of surface acoustic wave techniques, a variety of improved crystal controlled oscillator designs have become feasible and offer an alternative approach which eliminates some of the problems which have been experienced with bulk wave devices.

One of the simplest of these alternative approaches utilizes a surface acoustic wave delay line, the output of which is fed back to the input through an amplifier which supplies excess gain. Acoustic waves are well suited for employment in a delay line, because their velocity is typically five orders of magnitude lower than the velocity of an electrical signal, permitting usefully long delay times to be obtained in a reasonably sized device having dimensions on the order of centimeters. The operating principle of the surface acoustic wave (SAW) delay line oscillator is based on forming a return loop with gain in which the phase shift around the loop is an integer multiple of $2\pi$ radians for a particular frequency. To complete the device, this circuit must be coupled to a transmitting or receiving network, which may be electrical or, in the case of an acoustic device, may utilize a piezoelectric interaction.

Another type of SAW oscillator employs a pair of quarter wavelength spaced grating reflectors which are positioned on a substrate to form a surface wave resonant cavity. An interdigital transducer is placed within the cavity to provide the electrical input and output coupling port for the oscillator. Because of the narrow bandwidth associated with such distributed grating reflectors, it is possible to design a SAW resonator cavity which effectively responds to only a single longitudinal mode of acoustic waves.

The frequency control capabilities of the single mode SAW resonator are well known. In addition to this category of applications, however, the SAW resonator and the SAW delay line may also be used as strain sensors. In this configuration, an external perturbation, such as an acceleration or the weight of an object, is applied to distort the propagating medium. This perturbation is sensed by measuring the resulting change in the resonant frequency or the phase of the surface acoustic wave travelling in the delay line or the resonator. For the frequencies at which such devices are typically operated, the necessary electronics must be located physically close to the SAW components, since any significant length of connecting cable would introduce phase variations and adversely affect the measurement. In some applications for these devices, however, the environment in which the SAW sensor must be placed is too hostile (as in a high temperature, for example) for the electronic components to survive. Therefore, a need has developed in the SAW sensor art for a device in which the SAW components can be isolated from the electronics components.

SUMMARY OF THE INVENTION

It is a general objective of this invention to provide a new and improved surface acoustic wave device.

The interferometer of the invention includes a substrate with a first reflector and a second reflector disposed thereon to define a multimode resonant cavity. An input transducer is disposed on the substrate for generating surface acoustic waves in the cavity, and an output transducer is provided for detecting surface acoustic wave energy in the cavity.

In another embodiment, the interferometer also includes a third reflector, the second and third reflectors defining therebetween a single mode resonant cavity aligned with the mulitimode cavity. In this embodiment the output transducer is used to detect the interference between surface acoustic waves in the single mode cavity and in the multimode cavity.

In a more particular embodiment, the interferometer includes a piezoelectric substrate with a first surface wave grating reflector and a second surface wave grating reflector thereon to define a multimode resonant cavity. A third surface wave grating reflector is placed on the substrate so that the second and third reflectors define a single mode resonant cavity aligned with the multimode cavity. An input interdigital transducer within the single mode cavity generates surface acoustic waves in that cavity, while an output interdigital transducer in the multimode cavity is provided for detecting the interference between surface acoustic waves in the single mode cavity and in the multimode cavity.

The invention also includes a surface acoustic wave interferometer which is similar in structure but is equipped with a base which is rigidly affixed to the substrate in the region of the single mode cavity, so that a force applied to the substrate will alter the surface acoustic wave propagation characteristics within the multimode cavity but not within the single mode cavity. The substrate may be mounted on the base as a cantilever beam and may include a proof mass attached to the substrate to enhance the response of the transducer to applied acceleration.

A method of measuring a change in the propagation characteristics of surface acoustic waves in an object, according to the invention, includes the steps of providing a multimode resonant surface acoustic wave cavity in the object, generating surface acoustic waves in the cavity, detecting the interference pattern of surface acoustic waves in the cavity, and relating changes in the interference pattern to changes in the propagation characteristics of the surface acoustic waves.

These examples summarize some of the more important features of this invention. There are, of course, additional details involved in the invention, which are further described below and which are included within the subject matter of the appended claims.

BRIEF DESCRIPTION OF THE DRAWINGS

Additional objectives, features, and advantages of the present invention will be evident from the description below of the preferred embodiments and the accompanying drawings, wherein the same numerals are used to refer to like elements throughout all the figures. In the drawings.

DESCRIPTION OF THE PREFERRED EMBODIMENTS

Figure 1:
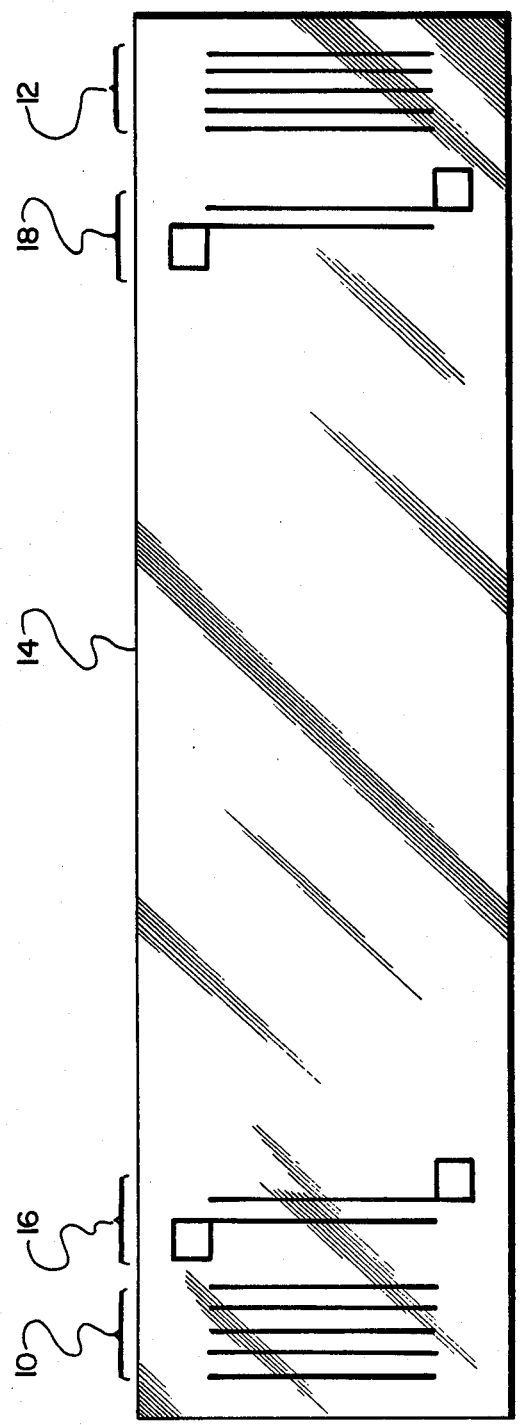
FIG. 1 is an illustration, in plan view, of one embodiment of a surface acoustic wave interferometer constructed according to the present invention.

FIG. 1 is a plan view of a surface acoustic wave interferometer constructed in accordance with the present invention. The interferometer includes a first surface wave grating reflector 10 and a second surface wave grating reflector 12 on a piezoelectric substrate 14. These reflectors are formed by techniques known to those skilled in the art, such as etching a series of grooves into the substrate or depositing on the substrate a series of parallel lines spaced apart a distance equal to one fourth of the wavelength of the desired operating frequency for the device. Although an actual device would typically employ reflectors with a much greater number of lines, the number shown in the drawning is limited to that which can be effectively illustrated. An input interdigital transducer 16 and an output interdigital transducer 18 are also located on the substrate 14. Again, these transducers are formed by techniques known in the art, and consist of parallel fingers of conducting material deposited on the substrate, with alternate fingers coupled to one of two pads. Such a transducer may be connected to an AC electrical source to generate surface acoustic waves in the substrate by the piezoelectric effect. Alternatively, surface acoustic waves propagating in the substrate can be detected by connecting the appropriate circuitry to the transducer.

It is an outstanding feature of the present invention to provide a surface acoustic wave device which responds to changes in the propagation characteristics of the surface acoustic waves by producing changes in the amplitude of the surface acoustic wave output. The reflectors 10 and 12 are spaced to define a cavity which is many times longer than the wavelength of the nominal frequency at which the device is to operated. When surface acoustic waves are generated in the cavity by the input transducer 16, the propagating waves will be reflected back and forth many times within the cavity by the reflectors. The multiple waves will then experience interference effects, so that waves at some frequencies will tend to increase in amplitude while other frequencies will be depressed in amplitude. This effect is analogous to that observed in an interferometer in which a beam of light is divided into two or more beams by partial reflection and transmission, the beams then being recombined after having travelled different path distances. In a similar manner, if the effective path length of the cavity is changed, the maxima and minima which may be detected in the output from the transducer 18 as a function of frequency will shift according to the change in path length. This effect can be utilized to achieve a very sensitive detection of a perturbation which affects the path length.

Figure 2:
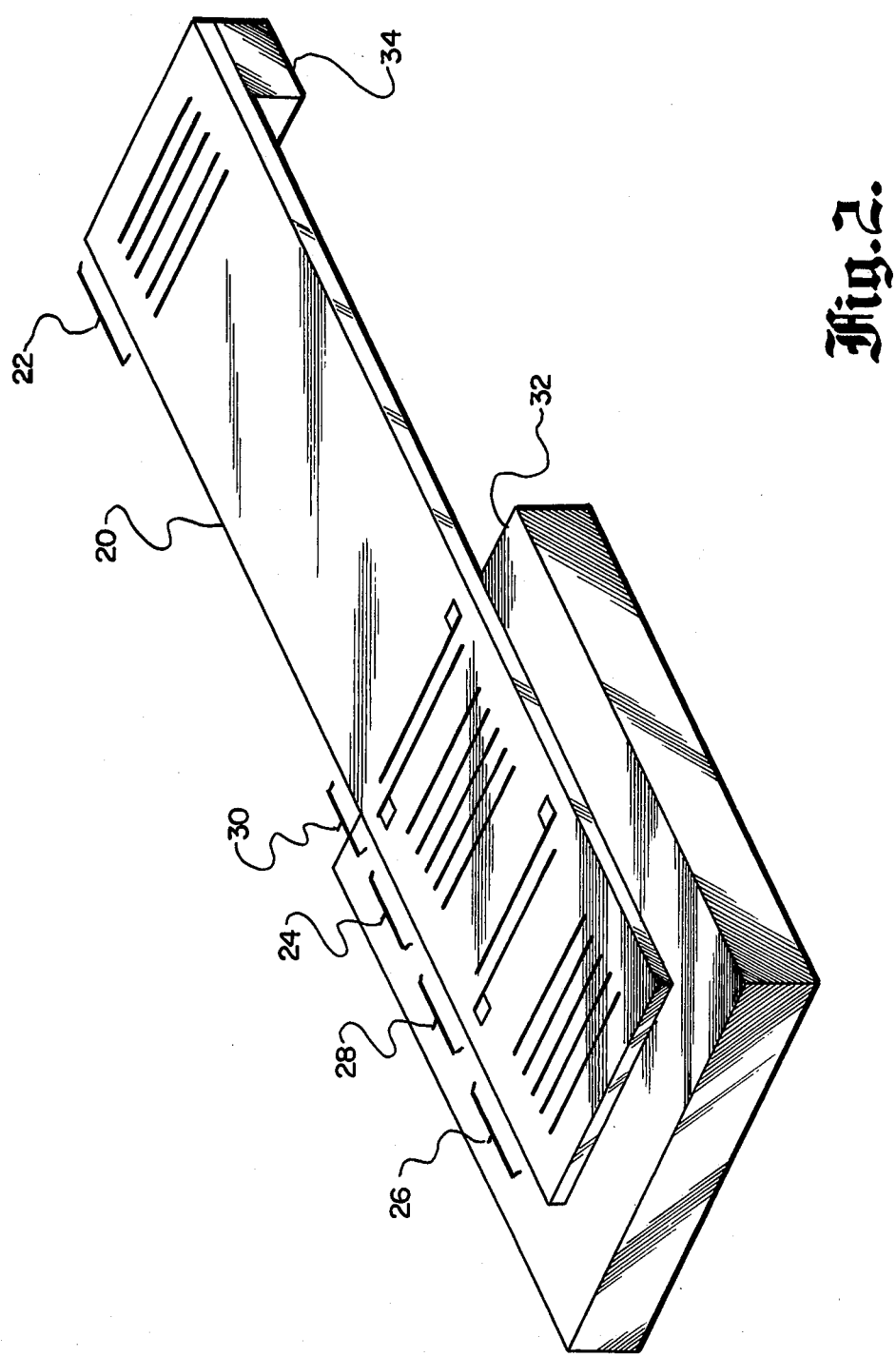
FIG. 2 is a perspective view of another surface acoustic wave interferometer constructed according to the present invention.

FIG. 2 is a perspective view showing an embodiment of the invention which was built to demonstrate the utility of the invention in detecting dynamic loading in terms of acceleration sensitivity. This surface acoustic wave interferometer was fabricated on a rotated 40° Y-cut quartz substrate 20 so that surface acoustic waves would propagate along the X-axis of the crystal. First and second reflectors 22 and 24 were formed by photoetching aluminum electrodes on the surface of the substrate, followed by CF$_4$ reactive ion etching of grooves within the grating. The reflectors 22 and 24 were spaced a distance of 1560 wavelengths at a nominal frequency of 173 MHz, so that a multimode resonant cavity was defined between them. A third reflector 26 was formed in a similar manner and spaced a distance of 42 wavelengths from the second reflector 24 to define a single mode resonant cavity aligned with the multimode cavity.

The reflectors 22 and 26 were fabricated with 400 reflecting strips to reflect greater than 99% of the surface acoustic wave energy incident upon them. The reflector 24, however, was limited to 150 reflecting strips, so that it would partially transmit acoustic waves incident upon it. This arrangement caused waves propagating in the single mode and multipole mode cavities to interact as a coupled two pole structure.

An input interdigital transducer 28 was located in the single mode cavity, while an output transducer 30 was fabricated in the multiple made cavity and near the second reflector 24. 40 finger pair apodized interdigital transducers were used. The interferometer was mounted as a cantilever beam, with the substrate 20 rigidly affixed to a base 32 in the region of the single mode cavity so that strains induced by loading the beam 20 substrate with proof mass 34 affected only the waves propagating in the multimode cavity.

Figure 3:
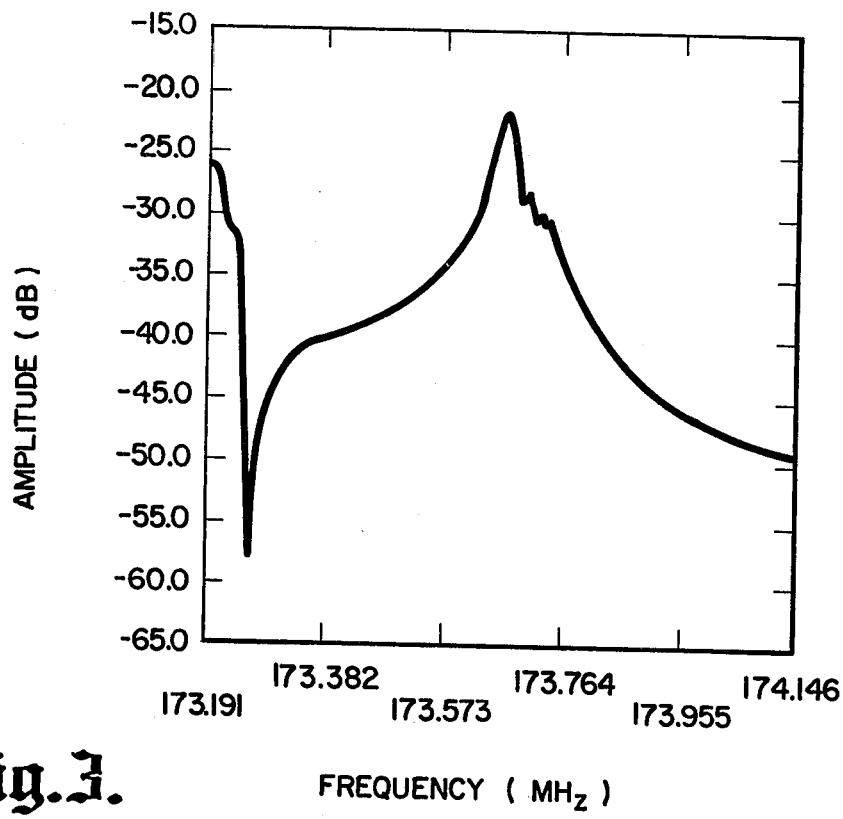
FIG. 3 is a plot showing the dependence of amplitude on frequency for the single mode cavity of the transducer shown in FIG. 2.
Figure 4:
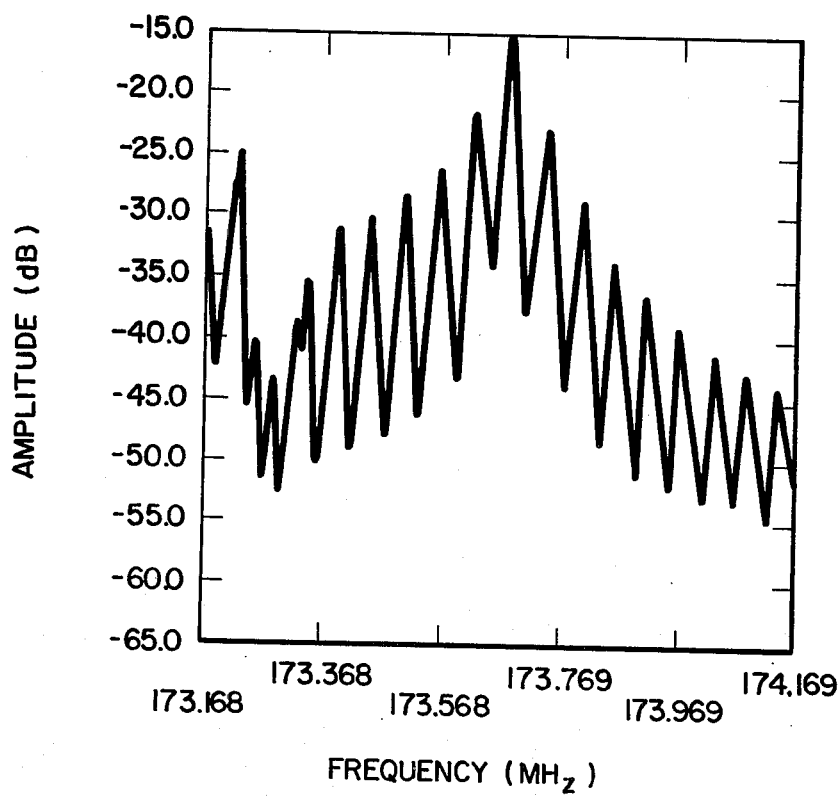
FIG. 4 is a plot similar to FIG. 3, but showing the interference which occurs between the surface acoustic waves in the single mode and multiple mode cavities of the transducer.

With damping applied to the propagation path in the multimode cavity, the frequency response of this device was as shown in FIG. 3, which is a plot of the amplitude detected by the output transducer 30 as a function of frequency. The resonance shown is due to the single mode response of the cavity between reflectors 24 and 26. The frequency spectra of the output were radically altered when the damping was removed and the third reflector was allowed to reflect waves from the multimode cavity to interfere with those from the single mode cavity. The frequency response for this mode of operation is shown in FIG. 4, which depicts the multiple longitudinal modes within the stopband of the reflectors. The multiple modes within the longer cavity interfere with the single mode of the shorter cavity, so that a variation in the SAW velocity in the multimode cavity will cause a variation of the modal frequencies of the cavity which are coupled to the single mode cavity. As a result, the multipole modes shown in FIG. 4 will appear to move with respect to the main resonance shown in FIG. 3 as the beam is loaded.

Figure 5:
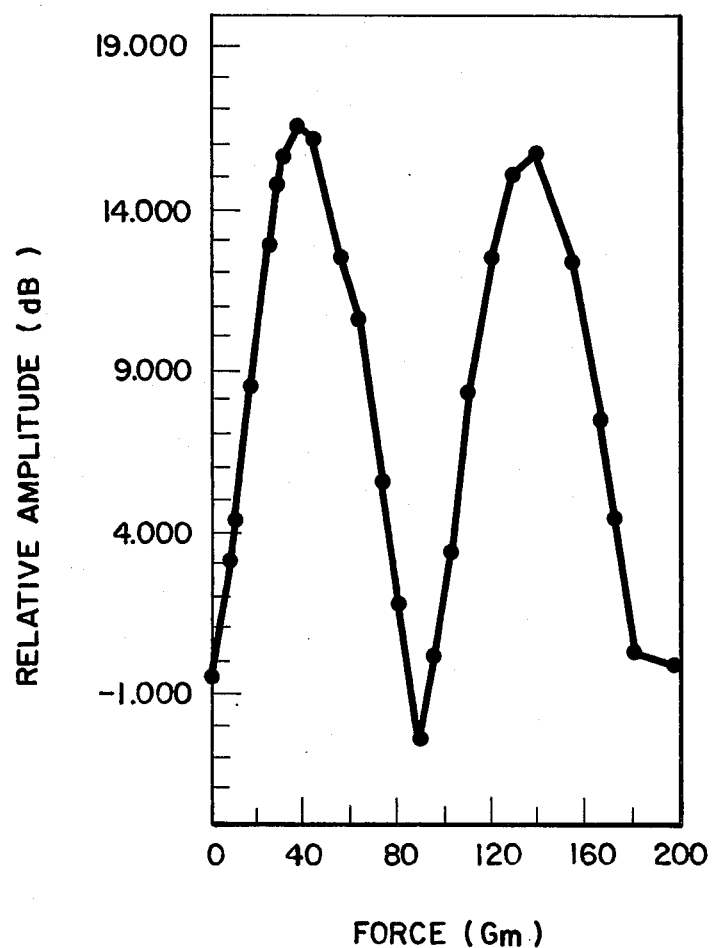
FIG. 5 is a plot illustrating the dependence of the amplitude output of the transducer in FIG. 2 on the applied force, for a fixed frequency.

By fixing the frequency at resonance and monitoring the amplitude of the signal detected at the output transducer 18, the response of the device to beam loading can be obtained. FIG. 5, for example, is a plot of the amplitude detected at a fixed frequency as a function of the force applied to the substrate 20. The cyclical nature of the amplitude fluctuations is related to changes in the length of the multimode cavity corresponding to integer half wavelengths.

In conclusion, the SAW interferometer of this invention permits the detection of an effective SAW velocity perturbation as a shift in modal frequencies. Unlike conventional SAW sensors, which respond only in terms of phase variations, the SAW interferometer provides an amplitude variation which is proportional to the applied loading. Dynamic loading, as in acceleration, will result in amplitude modulated sidebands at the modulation rate. Because the SAW interferometer output is not affected by external electrical phase variations, this sensor functions well at the end of a long cable and oscillator circuitry at the point of the test is not required.

Although some typical embodiments of the present invention have been illustrated and discussed above, modifications and additional embodiments of the invention will undoubtedly be apparent to those skilled in the art. Various changes, for example, may be made in the configurations, sizes, and arrangements of the components of the invention without departing from the scope of the invention. Furthermore, equivalent elements may be substituted for those illustrated and described above, parts or connections might be reversed or otherwise interchanged, and certain features of the invention might be utilized independently of the use of other features. Consequently, the examples presented herein, which are provided to teach those skilled in the art how to construct the apparatus and perform the method of this invention, should be considered as illustrative only and not inclusive, the appended claims being more indicative of the full scope of the invention.

What is claimed is:

1. A surface acoustic wave interferometer, comprising:
   a substrate;
   a first reflector and a second reflector disposed on said substrate to define a multimode resonant cavity therebetween;
   a third reflector disposed on said substrate, said second and third reflectors defining therebetween a single mode resonant cavity aligned with said multimode cavity;
   an input transducer disposed on said substrate for generating surface acousitc waves in said single mode cavity; and
   an output transducer disposed on said substrate for detecting the interference between surface acoustic waves in said single mode cavity and in said multimode cavity.

2. The interferometer of claim 1, wherein said input transducer is located in said single mode cavity and said output transducer is located in said multimode cavity.

3. The interferometer of claim 1, wherein said second reflector is partially reflecting, thereby transmitting a substantial portion of the surface acoustic wave energy incident thereon.

4. The interferometer of claim 1, wherein said substrate further comprises a piezoelectric substrate.

5. The interferometer of claim 4, wherein such reflectors further comprise surface wave grating reflectors and said transducers further comprise interdigital transducers.

6. A surface acoustic wave interferometer, comprising:
   a piezoelectric substrate;
   a first surface wave grating reflector and a second surface wave grating reflector disposed on said substrate to define a multimode resonant cavity therebetween;
   a third surface wave grating reflector disposed on said substrate, said second and third reflectors defining therebetween a single mode resonant cavity aligned with said multimode cavity;
   an input interdigital transducer disposed on said substrate in said single mode cavity for generating surface acoustic waves in said single mode cavity; and
   an output interdigital transducer disposed on said substrate in said multimode cavity for detecting the interference between surface acoustic waves in said single mode cavity and in said multimode cavity.

7. A surface acoustic wave interferometer, comprising:
   a substrate;

a first reflector and a second reflector disposed on said substrate to define a multimode resonant cavity therebetween;
a third reflector disposed on said substrate, said second and third reflectors defining therebetween a single mode resonant cavity aligned with said multimode cavity;
an input transducer disposed on said substrate for generating surface acoustic waves in said single mode cavity;
an output transducer disposed on said substrate for detecting the interference between surface acoustic waves in said single mode cavity and in said multimode cavity; and
a base rigidly affixed to said substrate in the region of said single mode cavity such that a force applied to said substrate will alter the surface acoustic wave propagation characteristics within said multimode cavity.

8. The transducer of claim 7, wherein said substrate is mounted on said base as a cantilever beam and further comprising a proof mass attached to said substrate.

* * * * *